United States Patent [19]
Gruetzmacher

[11] Patent Number: 6,026,581
[45] Date of Patent: *Feb. 22, 2000

[54] POCKET LEVEL WITH OPTIONAL MAGNET

[75] Inventor: Richard J. Gruetzmacher, Colgate, Wis.

[73] Assignee: Johnson Level & Tool Mfg. Co., Inc., Mequon, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/622,418

[22] Filed: Mar. 27, 1996

[51] Int. Cl.⁷ ...................................................... G01C 9/28
[52] U.S. Cl. ............................ 33/370; 33/377; 33/DIG. 1
[58] Field of Search .............................. 33/370, 333, 334, 33/DIG. 1, 379, 377

[56] References Cited

U.S. PATENT DOCUMENTS

| | | | |
|---|---|---|---|
| D. 308,810 | 6/1990 | Murawski | D8/87 |
| 1,229,916 | 6/1917 | Duncan | 33/370 |
| 2,624,118 | 1/1953 | Anderson | 33/370 |
| 3,186,099 | 6/1965 | Florko, Jr. | 33/DIG. 1 |
| 4,295,279 | 10/1981 | Sienknecht | 33/334 |
| 4,993,710 | 2/1991 | Marshall | 33/334 |
| 5,445,000 | 8/1995 | Brown | 33/DIG. 1 |
| 5,659,967 | 8/1997 | Dufour | 33/379 |

FOREIGN PATENT DOCUMENTS 376395  5/1964  Switzerland .............................. 33/333

OTHER PUBLICATIONS

"Telescoping Magnet" by Central Forge, Dec. 1998.

*Primary Examiner*—Christopher W. Fulton
*Attorney, Agent, or Firm*—Andrus, Sceales, Starke & Sawall

[57] ABSTRACT

A pocket level provided with magnet includes a housing having a sight opening formed therein. A liquid level indicator, in the form of a bubble vial having a pair of closed end walls, is slidably received within the open end portion of the housing and is observable through the sight opening. At least one of the closed end walls of the liquid level indicator is engageable with the housing. A cap is slidably inserted into the open end portion of the housing and a clip which is adapted to hold the level in one's pocket is secured thereto.

13 Claims, 2 Drawing Sheets

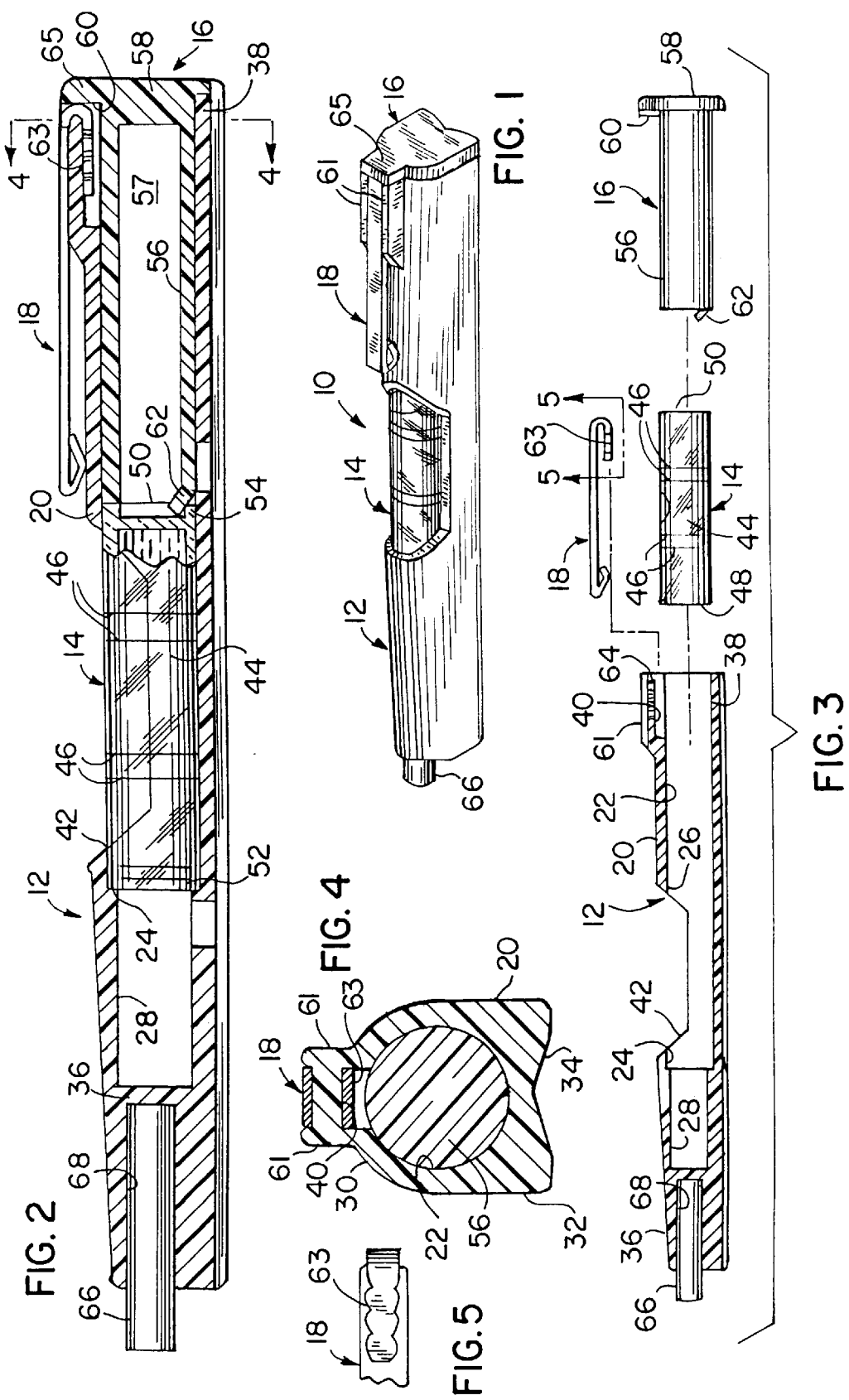

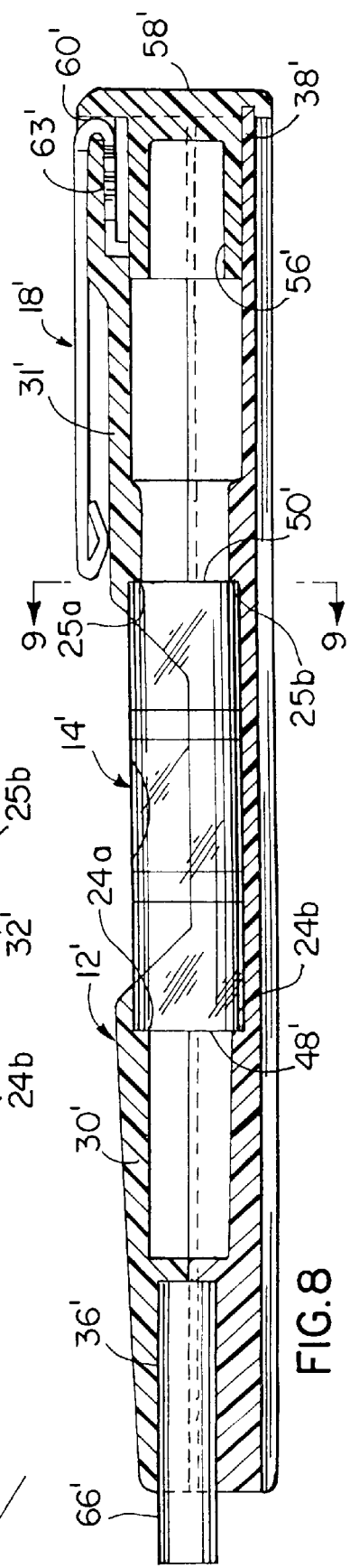

POCKET LEVEL WITH OPTIONAL MAGNET

FIELD OF THE INVENTION

This invention relates broadly to pocket levels, and more particularly to improvements in the manufacture and assembly of pocket level components which will ensure proper seating in the housing for a liquid level indicator, to provide precise level alignment with minimum effort and to provide economical assembly of the pocket level.

BACKGROUND OF THE INVENTION

In the manufacture and assembly of levels of the type described above, it is critical that the liquid level indicators such as vials, spirit tubes, and bubble chambers of the levels are precisely aligned relative to a gauging surface to ensure functional and operating accuracy. In the past, it has been the practice to obtain this accuracy by providing a separate and independent liquid level indicator and subsequently positioning the liquid level indicator in a precise manner within the level. The liquid level indicator has typically been mounted to the level utilizing precision equipment and highly skilled labor to assure accurate placement of the liquid level indicator with respect to the gauging surface of the level. Unfortunately, the use of highly skilled labor and the requirement for meticulous alignment of the liquid level indicator contribute to the cost of the end product.

Other attempts at cost reduction have been made in the molding and subsequent machining of the liquid level indicator. However, such operations involve not only the time and expense of skilled labor but are subject to machining error, thereby adding to the cost and possibility of error associated with their production.

Accordingly, it is the general aim of the invention to provide a new and improved pocket level which effectively reduces the labor requirements necessary in its production without compromising its accuracy. Another object of the invention is to provide a pocket level which can easily be assembled in a simple, economical manner while obviating the requirements for machining operations which increase cost and are susceptible to introducing inaccuracies in the finished level.

It is a further object of the invention to provide a new and improved pocket level in which a liquid level indicator may be precisely mounted without the need for special machinery. It is within the purview of the invention to provide a liquid level indicator which can be automatically and consistently mounted in the proper position both radially and axially without special tools. It is also within the scope of the invention to increase the usefulness of the pocket level by incorporating a magnet therein.

SUMMARY OF THE INVENTION

The present invention advantageously provides a pocket level which is susceptible of a relatively low cost of manufacture with respect to both materials and labor, and, in turn, is able to be offered at lower prices of sale to the consuming public. The pocket level features a simple assembly of components which will assure precise alignment of the liquid level indicator with the gauging surface of the level.

In one aspect of the invention, a pocket level comprises a housing having a closed end portion, an open end portion, and a sight opening formed therein. A liquid level indicator, such as a bubble vial, is slidably received in the open end portion of the housing and is observable through the sight opening. The liquid level indicator has a pair of closed end walls, at least one of the closed end walls being engageable with the housing. A cap is slidable into the open end of the housing and a clip is secured to the housing and is adapted to maintain the level in one's pocket. the cap may include an inner end which is engageable with the opposite closed end wall of the liquid level indicator for maintaining it in position relative to the housing. Preferably, the cap also functions to maintain the clip in engagement with the housing.

In yet another aspect of the invention, a method for providing a pocket level having a liquid level indicator with closed end walls comprises the steps of: providing a housing having a closed end portion, an open end portion and a sight opening formed therein; slidably inserting the liquid level indicator into the open end portion of the housing such that the liquid level indicator is observable through the sight opening and at least one of the closed end walls is engageable with the housing; and slidably inserting a cap into the open end of the housing. The method further preferably involves securing a clip to the housing, which is adapted to maintain the level in one's pocket to said housing.

In yet another aspect of the invention, a method for providing a pocket level having a liquid level indicator with closed end walls comprises the steps of: providing a housing having a closed end portion, an open end portion and a sight opening formed therein, the housing having an annular shoulder located adjacent one end of the sight opening; slidably inserting the liquid level indicator into the open end portion of the housing such that the liquid level indicator is observable through the sight opening and one of the closed end walls is engageable with the annular shoulder; and slidably inserting a cap into the open end portion of the housing such that the cap is engageable with the other of the closed end walls of the liquid level indicator. The method further preferably involves securing a clip to the housing, which is adapted to hold the level in one's pocket.

Still yet another aspect of the invention contemplates a method for providing a pocket level having a liquid level indicator with closed end walls, the method comprising the steps of: providing a housing having a closed end portion, an open end portion and a sight opening formed therein, the housing having a pair of spaced, annular shoulders formed therein, each of the shoulders being located adjacent one end of the sight opening; assembling the housing such that each of the annular shoulders is engageable with one of the closed end walls of the liquid level indicator and the liquid level indicator is observable through the sight opening; slidably inserting a cap into the open end portion of the housing; and securing a clip to the housing, which is adapted to hold the level in one's pocket.

Further objects, features and advantages of the invention will be made apparent from the following detailed description taken together with the drawings.

BRIEF DESCRIPTION OF THE DRAWINGS

The drawings illustrate the best mode presently contemplated of carrying out the invention.

In the drawings:

FIG. 1 is an isometric view of a pocket level constructed according to the present invention;

FIG. 2 is an enlarged, partial longitudinal sectional view of the pocket level shown in FIG. 1;

FIG. 3 is an exploded side view, with portions in section showing the components of the pocket level shown in FIG. 1;

FIG. 4 is a sectional view taken on line 4—4 of FIG. 2;

FIG. 5 is an enlarged detail view of the secured end of a pocket clip forming part of the pocket level of FIG. 1, with reference to line 5—5 of FIG. 3;

FIG. 6 is a side elevational view of an alternative embodiment of a pocket level constructed according to the present invention;

FIG. 7 is an exploded side elevation view, with portions in section, showing the components of the pocket level of FIG. 6;

FIG. 8 is an enlarged, partial longitudinal sectional view of the pocket level shown in FIG. 6; and FIG. 9 is an enlarged, sectional view taken on line 9—9 of FIG. 8.

DETAILED DESCRIPTION OF THE PREFERRED EMBODIMENT

In the drawings and description which follow, a new and improved pocket level with optional magnet embodying the principles and concepts of the present invention, and generally designated by the reference numeral 10, will be described in detail.

Referring to FIGS. 1–3, the pocket level 10 includes a housing 12, a liquid level indicator in the form of a bubble vial 14, a cap 16 and a clip 18. Housing 12 is a one-piece, elongate, partially hollow body, having an outer wall 20 which is generally tunnel-shaped in cross-section and an inner wall 22 which is circular in cross-section. Inner wall 22 is formed with an annular shoulder 24 located between a rearwardly-opening first segment 26 having a first, constant inner diameter and a forwardly extending second segment 28 having a second inner diameter which is smaller than the first diameter. The walls 20, 22 include a partially rounded upper half 30 and a lower half 32 including parallel side surfaces and a bottom surface 34 extending therebetween. Bottom surface 34 includes a shallow inverted V-shaped indentation extending throughout its length. Housing 12 also includes a slightly tapered, closed forward end portion 36 and an opposed, open rear end 38 which is formed with a recess 40 in the upper half 30 so that the rear end 38 is shaped in cross-section as seen in FIG. 4. An elongated sight opening 42 is formed medially of the upper half 30 and provides visual access to the usual bubble chamber 44 of bubble vial 14 aligned parallel to a longitudinal axis of housing 12.

Bubble vial 14 is conventional in construction, consisting of a partially liquid-filled closed cylinder, preferably formed of a transparent plastic material, having a diameter which is only slightly less than the inside diameter of inner wall segment 26, so as to enable bubble vial 14 to be slidably received in housing 12. The periphery of bubble vial 14 is provided with two sets of transversely extending lines 46 spaced equidistantly on opposite sides of the center of bubble vial 14, which serve as bubble limit lines. Bubble vial 14 is bounded on opposite ends by circular, recessed ends 48, 50, which define outwardly projecting lips 52, 54, respectively. Forward lip 52 is engageable with annular shoulder 24 to prevent the bubble vial 14 from moving axially in the housing 12 and to maintain the position of bubble vial 14 relative to sight opening 42.

Cap 16 includes a cylindrically-shaped, forwardly extending shaft segment 56, defining a cavity 57, which is slidable into the passage defined by rear inner wall segment 26. The forward end of shaft segment 56 is engageable against the rear end of lip 54 of bubble vial 14 to prevent axial movement thereof. A head segment 58 extends radially from and rearwardly of shaft segment 56, and fits against the open end 38 of housing 12. The cap 16 is locked radially on the housing 12 by means of an upper locating tab 60 which is slidably engageable in a rearwardly facing space located between a pair of rear outwardly extending clip mounting walls 61, which is in communication with recess 40 formed in the housing 12. The edges of tab 60 engage the facing rear end edges of mounting walls 61, to prevent rotation of cap 16 relative to housing 12.

Cap shaft segment 56 may be provided with an angled, upwardly extending finger 62 which is engageable against the lip 54 formed on the end 50 of bubble vial 14. The purpose of this fit between cap 16 and bubble vial 14 is to maintain a constant downward pressure on the bubble vial 14 against the lower half 32 of housing 12. This provides a constant position of bubble vial 14 relative to the gauging surface of level 10 provided by bottom surface 34, resulting in a high degree of accuracy for level 10.

Clip 18 includes a curved, serrated rear mounting portion 63 (FIG. 5) which is slidable into the upper portion of the recess 40 so as to engage a rearward end edge 64 of a wall 65 overlying recess 40 and located between mounting walls 61. The rear end of clip 18 is anchored between tab 60 and wall edge 64, so that the clip 18 extends axially along housing 12 and is maintained in position by cap head portion 58.

An optional magnet 66 may be fixedly secured within a cavity 68 in the closed end portion 36 of housing 12 to attract any ferrous material such as bolts, nails, tacks or the like. The pocket level 10 may also be supported by means of the magnet either above or below a magnetic article whereupon the indication on the bubble vial 14 may be readily determined without requiring the user to hold the indicator. In the preferred embodiment, the forward end portion of magnet 66 protrudes outwardly from the forward end of housing 12. It should be understood, however, that the magnet 66 may also be wholly encased within the material of housing 12 such that its forward end is spaced slightly rearwardly from the forward end of housing 12. In this manner, magnet 66 is invisible but is still operable to attract ferrous objects.

Housing 12 is preferably an injection molded member constructed of any suitable thermoplastic material. Magnet 66 is insert molded into housing 12 in accordance with conventional insert molding technology, whether mounted as shown in the drawings or fully encased by the material of housing 12.

Once bubble vial 14 has been slidably positioned in the housing 12, it should also be understood that the cap 16, the clip 18 and the magnet 66 may be secured in any suitable manner such as by adhesive bonding, sonic welding, or the like. In addition, portions of the housing 12, the cap 16 and the clip 18 may be suitably molded so as to provide an interference fit.

FIGS. 6–9 illustrate an alternative embodiment of a pocket level 10' comprising a housing 12', a bubble vial 14', cap 16' and a clip 18'. In this embodiment, housing 12' is a three-piece component including a pair of upper halves 30', 31' which cooperate with a lower half 32' to hold bubble vial 14' in position by means of alignable annular shoulders 24a, 24b, 25a, 25b formed on the housing components. Cap 16' has a shortened cylindrical segment 56' which is spaced from bubble vial 14' and functions in this version to close the open end portion 38' and provide a bearing surface for the clip 18'. Pocket level 10' is similar in other respects to the pocket level 10 of FIGS. 1–5.

By means of the above-described structure, it should be understood that bubble vial 14, 14' is prevented from moving axially or radially within housing 12, 12'. It will thus be seen that the present invention provides an improved pocket level which is easy to manufacture, assemble and use without special machinery and without special skill. It can also be appreciated that the present invention eliminates the need for highly skilled labor in production and assembly of the level and therefore provides substantial economy of manufacture without sacrificing accuracy.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

I claim:

1. A pocket level comprising:

a housing defining first and second spaced ends and a gauging surface, wherein the housing defines an axial passage extending inwardly from the second end, wherein the passage terminates in stop structure spaced inwardly from the second end;

a magnet nonremovably mounted to the first end of the housing and extending outwardly therefrom;

a level vial received within the passage, wherein the level vial defines a first end engaged with the stop structure and a second end spaced from the first end; and a cap member engaged with the second end of the housing and with the second end of the level vial for maintaining the level vial within the passage.

2. The pocket level of claim 1, wherein at least the first end of the housing is injection molded of a thermoplastic material, and wherein the magnet is insert molded into the first end of the housing, wherein an inner portion of the magnet is embedded within the thermoplastic material of the housing and an outer portion of the magnet extends outwardly from the first end of the housing.

3. The pocket level of claim 1, wherein the stop structure comprises a shoulder, wherein the passage defines a first segment extending in a first direction relative to the shoulder and a second segment extending in a second direction relative to the shoulder.

4. The pocket level of claim 1, wherein the cap member includes a shaft portion and a head portion, wherein the head portion has a transverse dimension greater than that of the passage and is engageable with the second end of the housing.

5. The pocket level of claim 1, further comprising a clip engageable with the housing and maintained in axial position relative to the housing by the cap member.

6. The pocket level of claim 1, wherein the housing includes an axial gauging surface oriented parallel to a longitudinal axis defined by the housing and to a longitudinal axis defined by the level vial, wherein the gauging surface includes an axially extending indented portion.

7. A pocket level, comprising:

a housing having an internal passage opening onto an open end portion;

stop structure associated with the internal passage and spaced from the open end portion;

a sight opening formed in the housing providing visual access to at least a portion of the internal passage;

a liquid level indicator slidably received in the open end portion of the housing and arranged such that at least a portion of the liquid level indicator is visible through the sight opening, wherein the liquid level indicator includes a first end engageable with the stop structure and a second end spaced therefrom;

a cap member engageable with the open end portion of the housing; and a clip engageable with the housing and maintained in axial position relative to the housing by the cap member, wherein the clip includes an offset mounting portion receivable within a recess defined by the housing adjacent the open end portion of the housing, and wherein the cap member includes a clip retaining portion which overlies the offset mounting portion of the clip to maintain the offset mounting portion of the clip within the recess when the cap member is engaged with the open end portion of the housing, so as to prevent the clip from moving axially relatively to the housing.

8. The pocket level of claim 7, wherein the clip retaining portion of the cap member comprises an outwardly extending section engageable with the offset mounting portion of the clip, and wherein the cap member includes a tab receivable within the recess defined by the housing for maintaining the cap member in a predetermined angular orientation relative to the housing.

9. A pocket level, comprising:

a housing defining an internal passage and a sight opening providing visual access to at least a portion of the internal passage, wherein the housing defines spaced first and second ends and wherein the internal passage opens onto the housing second end;

a level indicator disposed within the internal passage and having at least a portion visible through the sight opening;

a magnet nonremovably secured to the housing and extending from the housing first end; and a cap engageable with the second end of the housing, wherein the level indicator is slidable into the internal passage from the housing second end, and wherein the cap engages the level indicator to maintain the level indicator in position within the internal passage.

10. The pocket level of claims 9, further comprising a clip secured to the housing adjacent the second end of the housing, wherein the clip and the can define cooperating engagement structure for maintaining the clip in engagement with the housing.

11. A method for producing a pocket level having a liquid level indicator with closed end walls, said method comprising the steps of:

providing a housing having a closed end portion, an open end portion and a sight opening formed therein;

nonremovably mounting a magnet to the closed end portion of the housing such that an inner portion of the magnet is embedded within the material of the closed end portion and an outer portion of the magnet extends outwardly from the closed end portion;

slidably inserting the liquid level indicator into said open end portion of said housing such that said liquid level indicator is observable through said sight opening and at least one of said closed end walls is engageable with said housing; and slidably inserting a cap into said open end portion of housing into engagement with said liquid level indicator to maintain said liquid level indicator in position relative to said housing.

12. A method for providing a pocket level having a liquid level indicator with closed end walls, the method comprising the steps of:

provic ing a housing having a closed end portion, an open end portion and a sight opening formed therein, said housing having a pair of spaced, annular shoulders formed therein, each of said shoulders defining a respective end of said sight opening;

wherein said housing is constructed of a pair of housing sections which are assembled together such that each of said annular shoulders is engageable with one of said closed end walls of said liquid level indicator and said liquid level indicator is observable through said sight opening; and slidably inserting a cap into said open end portion of said housing after said pair of housing sections are assembled together.

13. The method of claim 12, including the step of providing a magnet in said housing.

* * * * *

UNITED STATES PATENT AND TRADEMARK OFFICE
CERTIFICATE OF CORRECTION

PATENT NO. : 6,026,581
DATED : February 22, 2000
INVENTOR(S) : Richard J. Gruetzmacher It is certified that error appears in the above-identified patent and that said Letters Patent is hereby corrected as shown below:

ClAIM 10, column 6, line 43, delete "claims" and substitute therefor --claim--;
CLAIM 10, column 6, line 45, delete "can" and substitute therefor --cap--.

Signed and Sealed this

Twenty-sixth Day of December, 2000

Attest:

Q. TODD DICKINSON

*Attesting Officer*     *Director of Patents and Trademarks*